Nov. 25, 1958　　　W. G. JENSEN　　　2,861,464
TRANSMISSION SELECTOR SERVO
Filed Jan. 21, 1958　　　2 Sheets-Sheet 1

W. G. JENSEN
INVENTOR.

BY E. C. McRae
J. R. Faulkner
T. H. Oster

ATTORNEYS

Nov. 25, 1958    W. G. JENSEN    2,861,464
TRANSMISSION SELECTOR SERVO
Filed Jan. 21, 1958    2 Sheets-Sheet 2

W. G. JENSEN
INVENTOR.

BY E. C. McRae
J. C. Faulkner
T. H. Oster
ATTORNEYS ated Nov. 25, 1958

United States Patent Office

2,861,464

TRANSMISSION SELECTOR SERVO

William G. Jensen, Dearborn, Mich., assignor to Ford Motor Company, Dearborn, Mich., a corporation of Delaware Application January 21, 1958, Serial No. 710,344

6 Claims. (Cl. 74—472)

This invention pertains to electrical servos and more particularly to a servo for electrically selecting the operating positions of an automatic transmission.

This application is a continuation-in-part of my copending application Serial No. 598,904, filed July 19, 1956, entitled "Power Selector."

An object of my invention is to provide a remote control position selector to move a selector lever of an automatic motor car transmission.

A further object of my invention is to provide an electrical follow-up system for positioning an output shaft of an electric motor.

An advantage of my invention lies in the employment of a unitary sector switch for the ignition neutral-start and back-up lamp controls.

Another advantage of my invention lies in the provision of a dynamic electric motor brake. I advantageously employ such a brake in a reversible electric motor to predictably stop its rotation upon interruption of electrical power.

These and other objects and advantages of my invention will become apparent from the study of the following detailed description of an embodiment in which.

Figure 1:
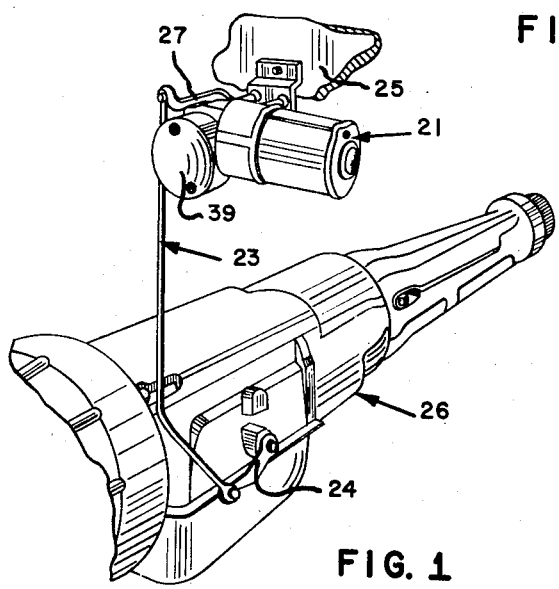
Figure 1 is a perspective view of an automatic transmission upon which my invention has been applied.
Figure 3:
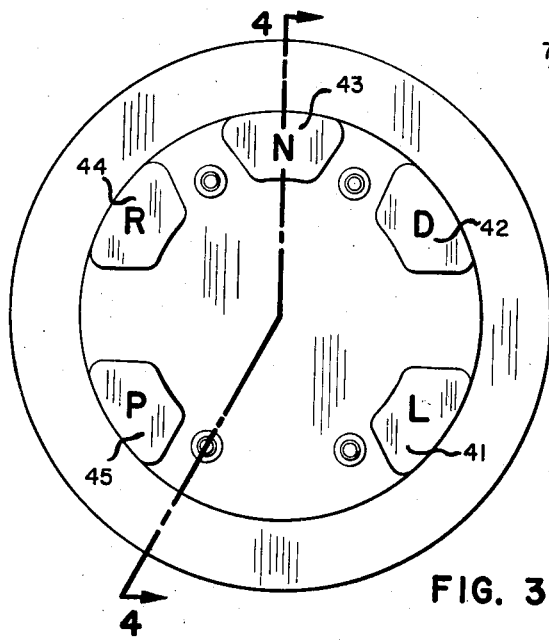
Figure 3 is a plan view of a push button selector assembly which may be employed in conjunction with my invention.

Referring to Figure 1, an automatic transmission is shown generally at 26, said transmission having a selector lever 24 operable to select the modes of operation within the transmission. Also, a partially broken-away section 25 of the fire wall is shown upon which is mounted an electrical servo motor shown generally at 21. Mounted on the output shaft of motor 21 is arm 27 which is operably connected to transmission arm 24 by rod 23. A housing portion 39 of motor 21 contains reduction gearing and also conveniently contains a portion of the electrical circuitry, that is, sector switch 22 shown in Figure 2.

Although motor 21 is shown as conveniently mounted on the fire wall 25, it is obvious that motor 21 may be mounted at any place where it is operable to select the transmission operating conditions.

Figure 2:
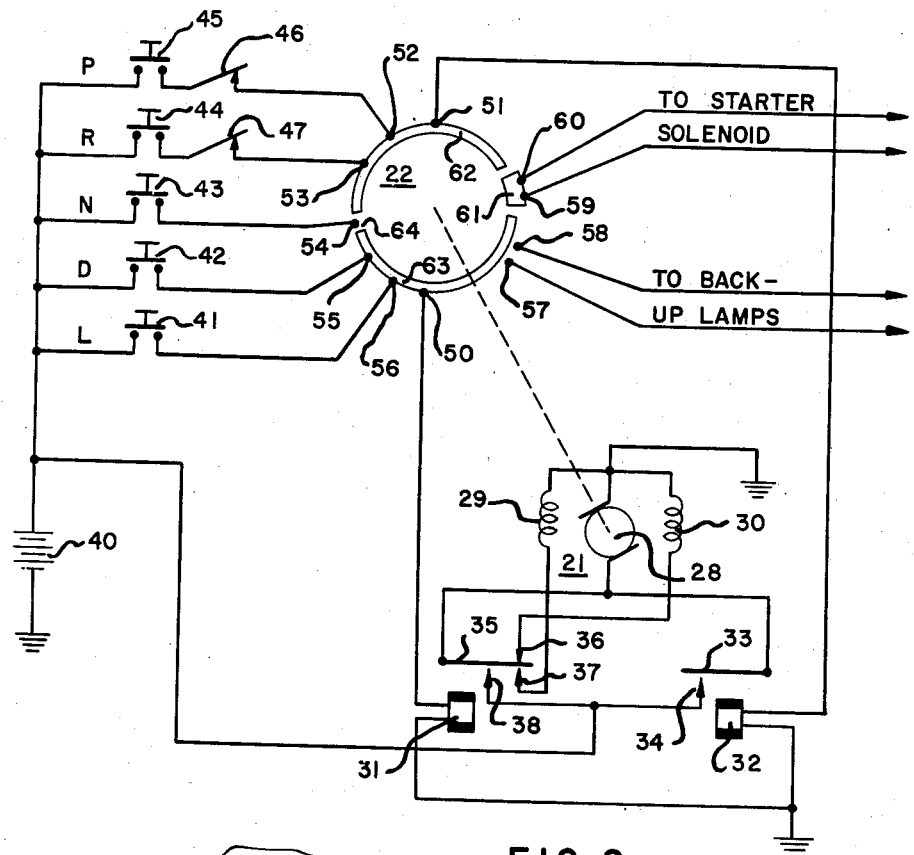
Figure 2 is an electrical circuit diagram of my invention.

Referring now to Figure 2, the motor armature 28 is shown as operably connected to sector switch 22. Motor 21 is a reversible, direct-current, shunt-wound motor having a pair of field windings operable upon energizing to cause either clockwise or counterclockwise rotation. It is apparent that a reversible, series-wound motor may also be used with advantage as it would not be operated in a no-load condition. Sector switch 22 consists of two large conductive segments 62 and 63 and a small conductive segment 61. The blank portions between the segments are non-conductive or dielectric. Small segment 61 serves to close a circuit between contacts 59 and 60 in the starter solenoid circuit thereby establishing the starter circuit, and when in registration with contacts 57 and 58 serves to close the circuit to the back-up lamps.

It is noted that five push button switches 41–45 are connected respectively to contacts 56 to 51 spaced arcuately about, and contactable with the large segments 62 and 63 of sector switch 22. These push buttons are labled L, D, N, R, and P, as shown, and represent the typical transmission operating conditions of Low, Drive, Neutral, Reverse and Park.

One terminal of each push button switch is in communication with battery 40 and the other terminal is connected to a fixed wiping contact on sector switch 22. Each push button is effective, when depressed, to supply power to the switch segment upon which its associated switch wiper is in contact.

Push button 45, representing the function of Park, includes a speed-limit switch 46 which is closed when the motor car is stopped, but which opens at very low vehicle speeds thereby disabling the push button circuit. Similarly, push button 44, representing Reverse, is connected to contact 53 through speed limit switch 47 which has precisely the same function as switch 46.

Sector switch segments 62 and 63 are spaced from each other by a dielectric portion 64. This portion is wide enough to accept only one contact at a time. Segment 62 is continuously connected to relay 32 through contact 51 and segment 63 is connected to relay 31 through contact 50. Relay 32 is operable to energize motor 21 to cause clockwise rotation of sector switch 22 as viewed in Figure 2 and relay 31 is effective to cause counterclockwise rotation of switch 22. Battery 40 is connected to one terminal of the push buttons and to contact 38 of relay 31 and contact 34 of relay 32.

The armature 33 of clockwise relay 32 is connected to the motor armature 28 and to the armature 35 of counterclockwise relay 31. In the unenergized position, as shown, motor field winding 30 is connected to motor armature 28 through contact 36. This forms a closed circuit for armature 28 through the low impedance field 30 and therefore forms a dynamic brake on armature 28 when the motor overruns due to inertia. Also, relay 32 is effective to supply power directly to the motor armature and to field 30 through contact 36 for clockwise rotation, and relay 31 is effective to energize field 29 for counterclockwise rotation.

In the operation of this embodiment, the closure of a button, say Reverse button 44, applies power to segment 62 which energizes clockwise relay 32. Motor 21 will rotate sector switch 22 until the dielectric portion 64 is placed over contact 54 thereby breaking the circuit to relay 32. The short-circuited condition of armature 28 to field 30 quickly brakes the rotation of the motor armature. Since the spacing of the push-button-connected contacts correspond to the motor shaft movement necessary to select each transmission function, it is seen that the energization of either segment 62 or 63 will cause appropriate switch rotation to disconnect the circuit and thereby select the transmission function.

In the reverse position, small segment 62 shorts contacts 58, 57 in the back-up light circuit. In the neutral position, as shown, the starter circuit is completed through contacts 59, 60 and is broken in any other position.

It is, of course, necessary to provide a means for preventing more than one push button switch to be closed at any one time. Any suitable mechanical or electrical interlocking device may be employed for this purpose to be conveniently located in the passenger compartment. A mechanical arrangement which has proven highly satisfactory is shown in Figures 4-7. This arrangement is the subject of a copending application of which I am inventor, Serial No. 598,871, filed July 19, 1956, entitled Interlocking Device.

This mechanical interlock consists essentially of three relatively rotatable plates having cam surfaces in cooperative relationship with a plurality of sliding pins in such a manner that the cams will act upon any pin member that has been radially moved inward when any subsequent pin is moved inward.

Figure 4:
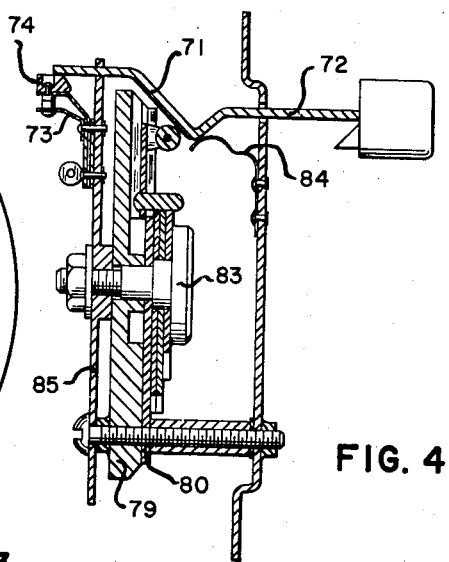
Figure 4 is a sectional view taken along line 4—4 of Figure 3.

Five push buttons 41-45 are arranged in a circle and are carried on parallel movable slides 72 which have a cam portion 71 formed thereon as best shown in Figure 4. Switch 73 is mounted on a switch-supporting disc 85 and has an insulated moving contact 73 which is depressed by slide 72 to close an electrical circuit. One such switch is operated by each push button.

The cam portions 71 in cooperation with radical slide carriages 75 and cam plates 76-78 cause any previously depressed button to be raised upon the depression of another button. Each carriage 75 is slidably received within radical slots cut in base 79 and held in place by a retainer plate 80. As shown best in Figure 6, each carriage has an upright, cam-operating pin 81 and a roller 82. The pin 81 is adapted to engage the cam plates 76-78 and the roller 82 engages cam portion 71 of slide 72.

Cam plates 76-78 are individually rotatably, and coaxially mounted on base 79 and are held in place by a cap screw 83. In the operation of this interlock switch a button is depressed, say button 43, as shown in Figure 4. This movement forces the carriage radially inwardly which carries cam coacting pin 81 toward the rout of the teeth on the cam plates.

Figure 7:
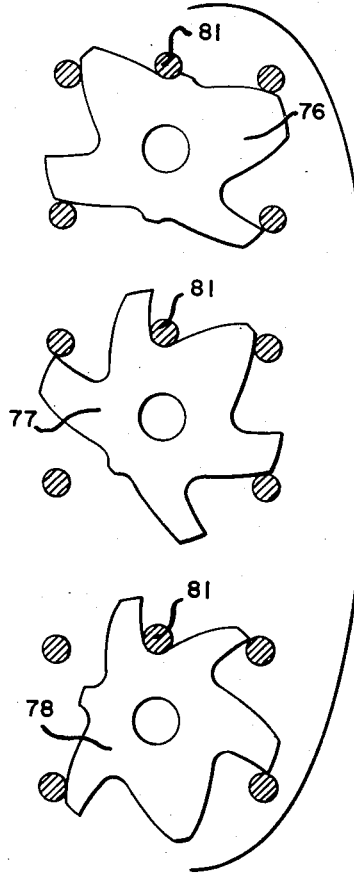
Figure 7 is an exploded view of the three superimposed cam plates in the selector assembly.
Figure 5:
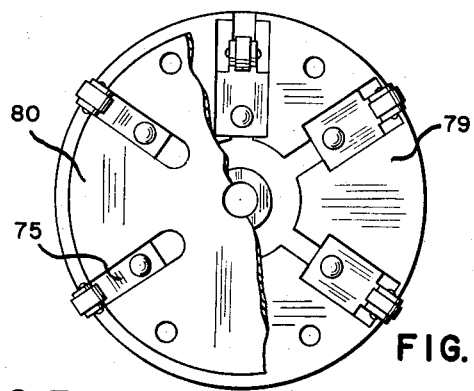
Figure 5 is a plan view of the base plate of the selector with a retainer plate shown as partially broken away.
Figure 6:
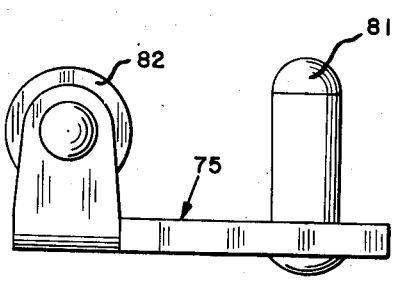
Figure 6 is an elevational view of one of the carriages.

To assist in an understanding of this relationship, an exploded view of the cam plates is presented as Figure 7. The carriage pins are shown in section thereon, each pin being illustrated three times, once for each cam plate. The movement of pin 81 inwardly forces any pin previously so moved to be returned by the effect of rotation of one or more of the cam plates. The outward movement of carriage 75 causes slide 72 to be returned to the right-hand position. A detent spring 84 assists in the movement of slide 72 by acting upon cam portion 71 to provide two stable slide positions: depressed and released.

It is, therefore, seen that this arrangement provides a simple fool-proof mechanical interlock for the operation of push buttons 41-45.

I claim:

1. A power selector for positioning a movable control member in an automatic transmission for selecting a plurality of transmission operating conditions comprising a reversible electric drive motor having an output shaft, said output shaft operably connected to a control member on said transmission for selecting said conditions, said motor including a pair of electrical inputs, one of said inputs operable when energized to effect clockwise rotation of said shaft, and the other input operable when energized to effect counterclockwise rotation of said shaft, a sector switch driven by said shaft and having first and second conductive segments separated by a dielectric portion, a plurality of relatively fixed wiping contacts one for each transmission operating condition, said contacts arranged to electrically engage said segments and spaced from each other in proportion to the shaft movement necessary to selectively place each contact in alignment with said dielectric portion concomitant with the engagement of the particular transmission operating function represented by said contact, said dielectric portion having a width less than the least width between said contacts while wide enough to accept one of said contacts at a time, a source of electric energy, a plurality of manually operated circuit closing switches, interlock means preventing more than one switch to be closed at any one time, one each of said switches connected to each of said contacts, electrical circuit means operable upon energization of one of said sector switch segments to energize said clockwise motor input from said source and operable upon energization of the other of said switch segments to energize said counterclockwise motor input from said source, each of said switches individually adapted to energize one of said segments from said source when the wiping contact connected to said switch is in contact with one of said segments thereby energizing one of said motor inputs to cause said shaft to rotate bringing said contact in alignment with said dielectric portion.

2. A power selector for positioning a movable control member in an automatic transmission for selecting a plurality of transmission operating conditions comprising a reversible electric drive motor having an output shaft, said output shaft operably connected to a control member on said transmission for selecting said conditions, said motor including a pair of electrical inputs, one of said inputs operably when energized to effect clockwise rotation of said shaft and the other operable when energized to effect counterclockwise rotation of said shaft, a sector switch carried by said shaft and having first and second arcuate conductive sements on a common radius and separated by a dielectric portion, a plurality of relatively fixed wiping contacts one each for each transmission operating condition, said contacts arranged to electrically engage said segments and spaced from each other in arcuate fashion by an amount corresponding to the shaft movement necessary to selectively place each contact in alignment with said dielectric portion concomitant with the engagement of the particular transmission operation function represented by said contact, said dielectric portion having a width less than the least width between said contacts, while wide enough to accept one of said contacts at a time, a source of electric energy, a plurality of manually operated circuit closing switches, one each of said switches connected to each of said contacts, electrical circuit means operably by current through one of said switch segments to energize said clockwise motor input from said source and operable by current through the other of said switch segments to energize said counterclockwise motor input from said source, each of said switches individually adapted to energize one of said segments from said source when the wiping contact connected to said switch is in contact with one of said segments thereby energizing one of said motor inputs to cause said shaft to rotate in a direction to bring said contact in alignment with said dielectric portion.

3. A device for positioning a selector lever of an automatic transmission thereby selecting the operative positions thereof comprising in combination an electric motor, said motor operatively connected to a transmission selector level through reduction gearing and including a first electrical input for clockwise rotation and a second electrical input for counterclockwise rotation, a rotary switch driven by said motor and including a pair of arcuate conducting portions separated by a non-conducting portion, a plurality of contacts engaging said portions in spaced relationship to each other and adapted to continuously contact said portions upon rotation of said switch by said motor, said non-conducting portion adapted to accommodate one of said contacts at one time, a plurality of circuit closing push button switches one each for each operative function of the transmission, means for locking each of said push buttons in a depressed position and for releasing any previously depressed button as each push button is depressed, each push button switch connected by a wire to a separate contact on said rotary switch, said contacts angularly separated from each other by the amount of switch rotation necessary for the motor driven lever to select the several transmission functions and oriented so that when the switch contact connected to the push button that corresponds to the selected function is on the non-conductive portion that function is also selected by said selector lever, means connecting the more clockwise of said conductive portions to said counterclockwise input, and means connecting the other conductive portion to said clockwise input, an electrical power source intermediate said push button switches and said motor whereby the depression of a push button switch operates to apply power to said motor through said rotary switch to cause said motor to turn in a direction to select the function represented by said switch concomitant with coincidence of the contact connected to the push button on the non-conductive portion.

4. A power selector for positioning a movable control member in an automatic transmission for selecting a plurality of transmission operating conditions comprising a reversible drive motor having an output shaft, said output shaft operably connected to a control member on said transmission for selecting said conditions, a switch driven by said shaft and having first and second conductive segments separated by a dielectric portion, a plurality of relatively fixed wiping contacts one for each transmission operating condition, said contacts arranged to electrically engage said segments and spaced from each other in proportion to the shaft movement necessary to selectively place each contact in alignment with said dielectric portion concomitant with the engagement of the particular transmission operating function represented by said contact, said dielectric portion having a width less than the least width between said contacts while wide enough to accept one of said contacts at a time, a source of electric energy, a plurality of manually operated circuit closing switches, interlock means preventing more than one switch to be closed at any one time, one each of said switches connected to each of said contacts, and means operable upon energization of one of said switch segments through a wiping contact to cause said drive motor to turn in one direction to place said contact in registry with said dielectric portion and operable upon energization of the other of said switch segments through a wiping contact to cause said drive motor to turn in the other direction to place the contact in registry with said dielectric portion.

5. A power selector for positioning a movable control member in an automatic transmission for selecting a plurality of transmission operating conditions comprising a reversible electric drive motor having an output shaft, said output shaft operably connected to a control member on said transmission for selecting said conditions, said motor including a pair of electrical inputs, one of said inputs operable when energized to effect clockwise rotation of said shaft and the other operable when energized to effect counterclockwise rotation of said shaft, a switch driven by said shaft and having first and second separated conductive segments and defining a dielectric portion therebetween, a plurality of spaced wiping contacts one each for each transmission operating condition, said contacts arranged to electrically engage said segments, said dielectric portion having a width less than the least width between said contacts, while wide enough to accept one of said contacts at a time, a source of electric energy, a plurality of circuit closing switches, one each of said switches connected to each of said contacts, electrical circuit means operable by current through one of said switch segments to energize said clockwise motor input from said source and operable by current through the other of said switch segments to energize said counterclockwise motor input from said source, each of said switches individually adapted to energize one of said segments from said source when the wiping contact connected to said switch is in contact with one of said segments thereby energizing one of said motor inputs to cause said shaft to rotate in a direction to bring said contact in alignment with said dielectric portion.

6. A device for positioning a selector lever of an automatic transmission thereby selecting the operative positions thereof comprising in combination an electric motor, said motor operatively connected to a transmission selector level through reduction gearing and including a first electrical input for clockwise rotation and a second electrical input for counterclockwise rotation, a rotary switch driven by said motor and including a pair of arcuate conducting portions separated by a non-conducting portion, a plurality of contacts engaging said portions in spaced relationship to each other and adapted to continuously contact said portions upon rotation of said switch by said motor, said non-conducting portion adapted to accommodate one of said contacts at one time, a plurality of circuit closing switches one each for each operative function of the transmission, each circuit closing switch electrically connected to a separate contact on said rotary switch, said contacts angularly separated from each other by the amount of switch rotation necessary for the selector lever to select the several transmission functions and oriented so that when the switch contact that corresponds to the selected function is on the non-conductive portion that function is also selected by said selector lever, means connecting the more clockwise of said conductive portions to said counterclockwise input, and means connecting the other conductive portion to said clockwise input, an electrical power source intermediate said circuit closing switches and said motor whereby the closure of one of said switches operates to apply power to said motor through said rotary switch to cause said motor to turn in a direction to select the function represented by said switch concomitant with coincidence of the contact thereby energized on the non-conductive portion.

References Cited in the file of this patent

FOREIGN PATENTS 848,454     Germany _____ Sept. 4, 1952